I. DUNHAM.
Cooking Utensils.

No. 150,752.    Patented May 12, 1874.

WITNESSES:
E. Wolff
Sedgwick

INVENTOR:
I. Dunham
BY
ATTORNEYS.

UNITED STATES PATENT OFFICE.

IRA DUNHAM, OF PLATTSBURG, MISSOURI.

IMPROVEMENT IN COOKING UTENSILS.

Specification forming part of Letters Patent No. 150,752, dated May 12, 1874; application filed October 18, 1873.

*To all whom it may concern:*

Figure 1:
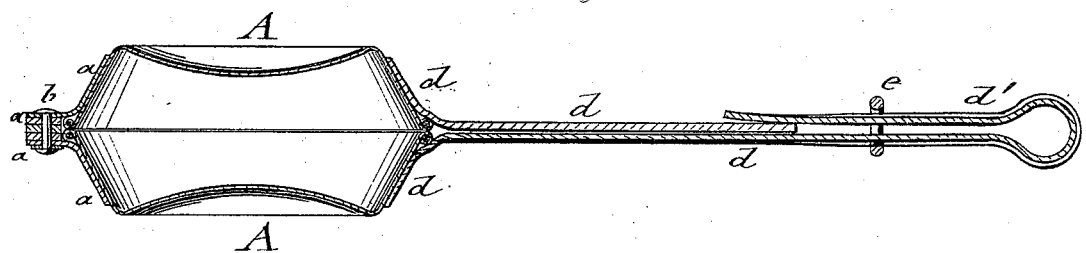
Figure 2:
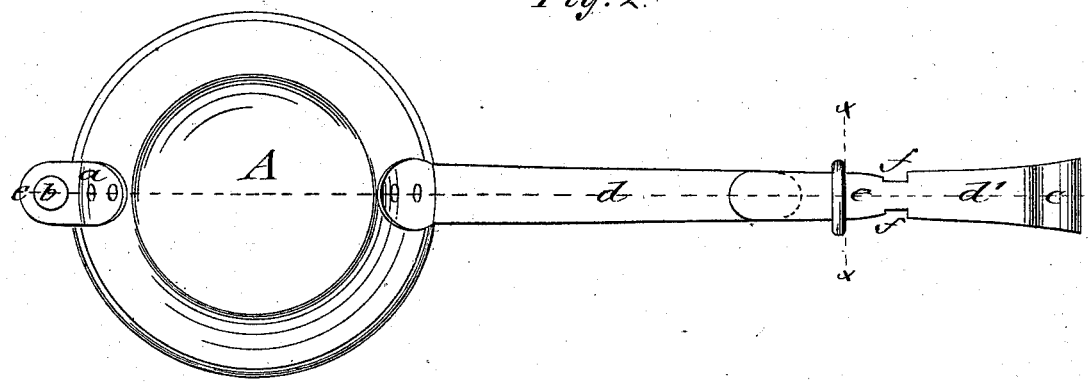
Figure 3:

Be it known that I, IRA DUNHAM, of Plattsburg, in the county of Clinton and State of Missouri, have invented a new and Improved Cooking-Vessel, of which the following is a specification:

In the accompanying drawing, Figure 1 represents a vertical longitudinal section on the line $c\ c$, Fig. 2, of my improved cooking-vessel. Fig. 2 is a top view of the same; and Fig. 3 is a detail cross-section through the handles on the line $x\ x$, Fig. 2, showing the method of fastening the same.

Similar letters of reference indicate corresponding parts.

The object of my invention is to provide a cooking-vessel for broiling meats, roasting coffee, and other purposes, which is easily and conveniently applied, readily thrown open, and held tightly closed during use. My invention consists of two pans of equal size, which are pivoted together, facing each other, and closed by a longer handle with spring extension, which takes hold of the shorter handle, and holds the same in position by a sliding clasp-link.

In the drawing, A represents the pans, of flat shape and suitable material, which are pivoted together by means of forward-extending lugs $a$, connected by a pin or rivet, $b$. The circumferences of both pans A fit closely together, and are provided, at points opposite to lugs $a$, with handles $d$, of which one is longer than the other, and forms, by being bent back into a hook-shaped extension, $d'$, a convenient part for hanging up the vessel, and also a cool handle for the same. The extension $d'$ acts, also, like a spring on the shorter handle $d$ when the same is slipped under it, being then firmly retained in that position by passing a clasp-link, $e$, forward over the handles $d$.

For opening the pans A, the link $e$ is carried back, resting then in recesses $f$ of longer handle $d$, and of spring part $d'$, so that the shorter handle $d$ may be easily taken out and one pan be thrown open as much as desired, and remain in that position till emptied, refilled, &c.

One hand only is required to handle the vessel, while the other is free to attend to other purposes, forming thus a very convenient cooking-vessel for family and other uses.

Having thus described my invention, I claim as new and desire to secure by Letters Patent—

As an improvement in cooking-vessels, the pivoted pans A A, provided with handles $d\ d$, the longer of which clasps, by spring-hook extension $d'$ and link $e$, the shorter one, arranged and operated substantially as and for the purposes described.

IRA DUNHAM.

Witnesses:
T. R. LIVINGSTON,
GEORGE JACOBS.